Feb. 3, 1959  D. GIACOSA  2,871,968
LUGGAGE AND SPARE WHEEL COMPARTMENT STRUCTURE
ON REAR-ENGINED VEHICLES
Filed Sept. 4, 1956  5 Sheets-Sheet 1

Feb. 3, 1959 D. GIACOSA 2,871,968
LUGGAGE AND SPARE WHEEL COMPARTMENT STRUCTURE
ON REAR-ENGINED VEHICLES
Filed Sept. 4, 1956 5 Sheets-Sheet 4

United States Patent Office 2,871,968
Patented Feb. 3, 1959

2,871,968

LUGGAGE AND SPARE WHEEL COMPARTMENT STRUCTURE ON REAR-ENGINED VEHICLES

Dante Giacosa, Turin, Italy, assignor to Sira Società Industriale Ricerche Automotoristiche, Turin, Italy Application September 4, 1956, Serial No. 607,890

Claims priority, application Italy September 8, 1955

4 Claims. (Cl. 180—54)

This invention relates to a rear-engined motor vehicle and provides a novel arrangement of the spare wheel such as to leave a space available for baggage in parts of the car normally occupied by the spare wheel.

The improved motor vehicle comprises a compartment adapted to receive the spare wheel located between the rear car seats and engine.

The invention shall be described by way of example with reference to the accompanying drawings, wherein.

Figure 1:
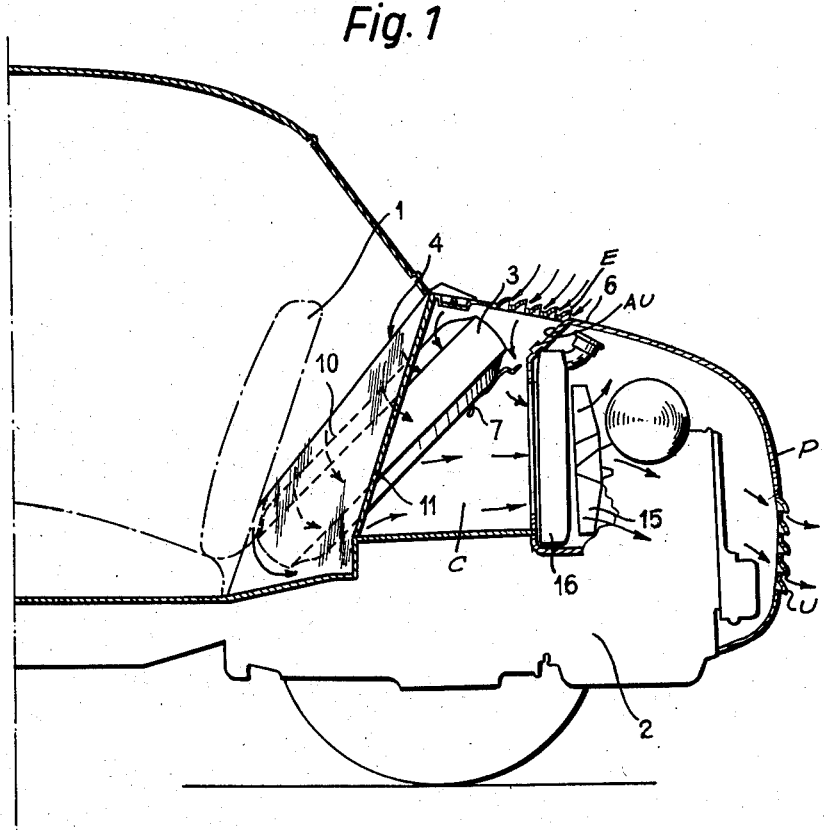
Figure 1 is a diagrammatic view of the motor car on a vertical plane.

On the drawings the rear car seats and propelling unit are denoted by 1 and 2, respectively.

The spare wheel 3 is arranged in a compartment between the rear seats 1 and propelling unit 2. This compartment is confined in front and at the top by an inclined wall 4 and the engine hood 6, respectively. The wheel 3 rests in an inclined position on supports 7.

Figure 2:
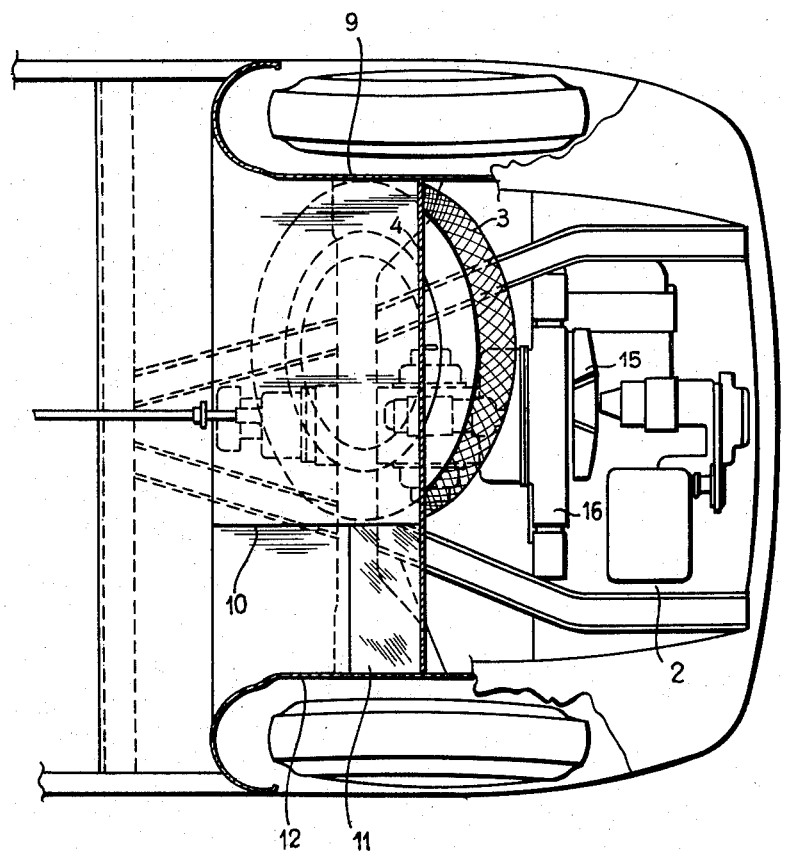
Figure 2 is a plan view.

As more clearly shown in Figure 2, which is a plan view of Figure 1, the body top and engine hood 6 having been broken away, the spare wheel compartment is arranged on one side of the vehicle and is laterally confined by a passageway 9 for a wheel and a vertical wall 10 secured to the inclined wall 4. This leaves a supplementary space available for baggage, which is confined by said vertical wall 10, a second inclined wall 11 and the passageway 12 for the opposite wheel of the vehicle.

Figure 3:
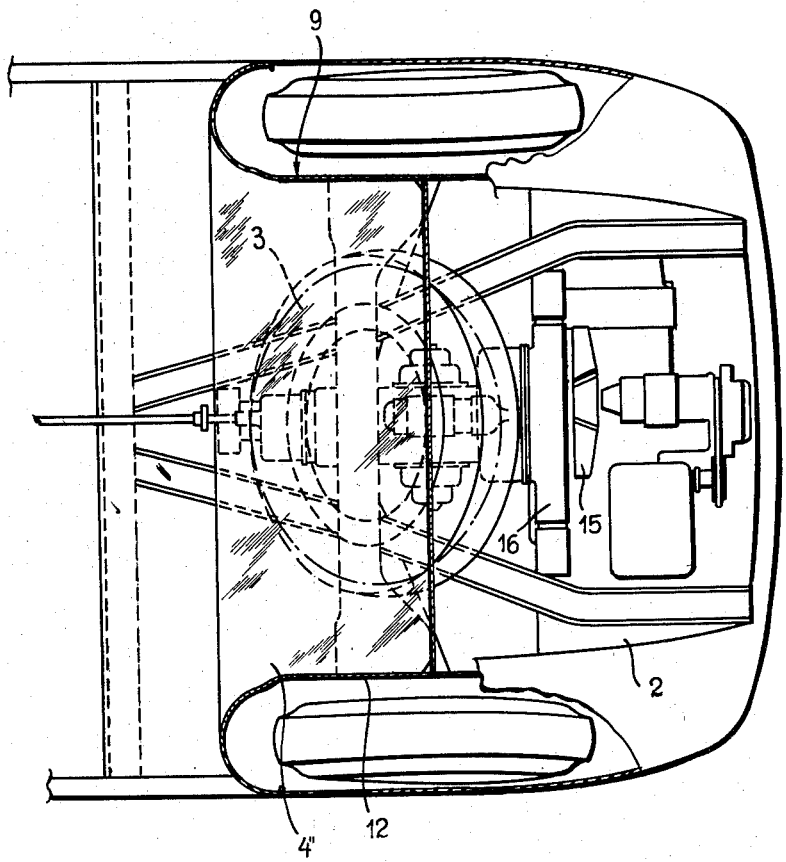
Figure 3 is a plan view of a modification of Figure 1.

In the modified construction shown in Figure 3 the compartment for the spare wheel is arranged centrally of the car for the sake of simplicity in construction, the forward wall 4″ extending from the passageway 9 to the passageway 12 for the wheels.

Figure 4:
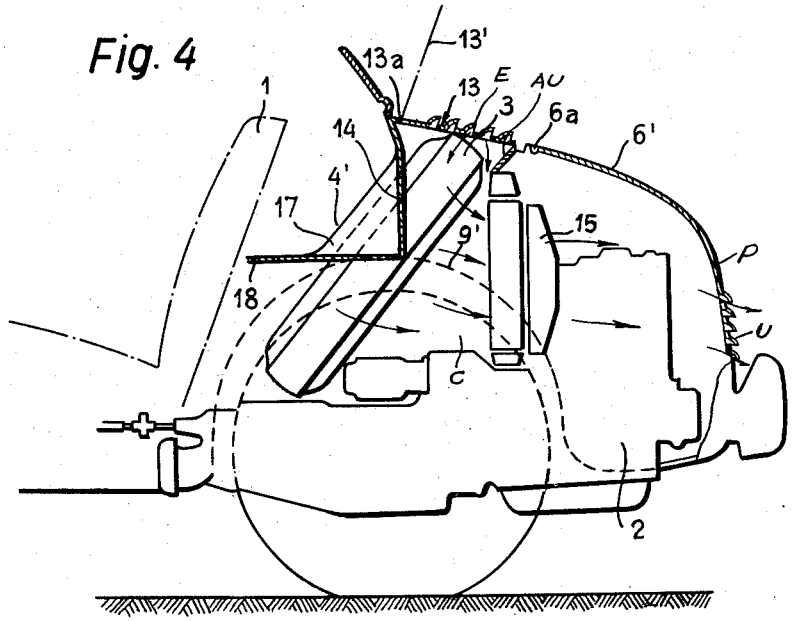
Figures 4, 5 and 6 are a vertical sectional view, a perspective and a plan view respectively of a further modified construction.
Figure 5:
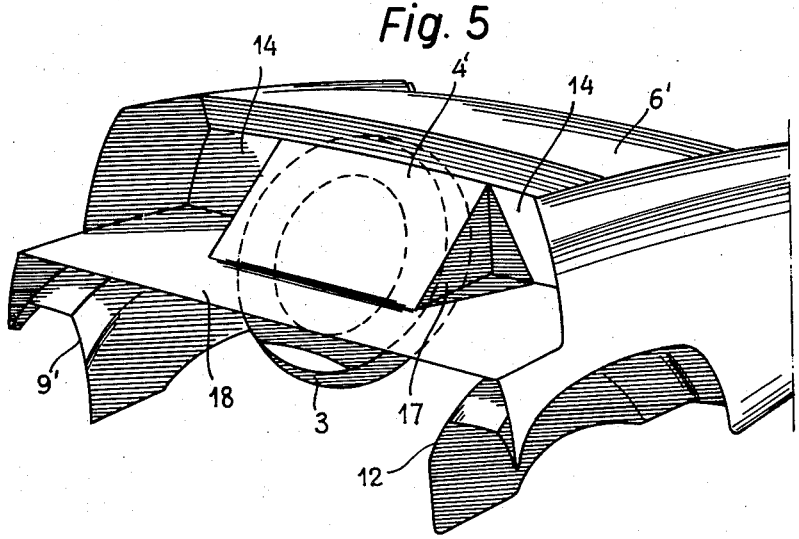
Figure 6:
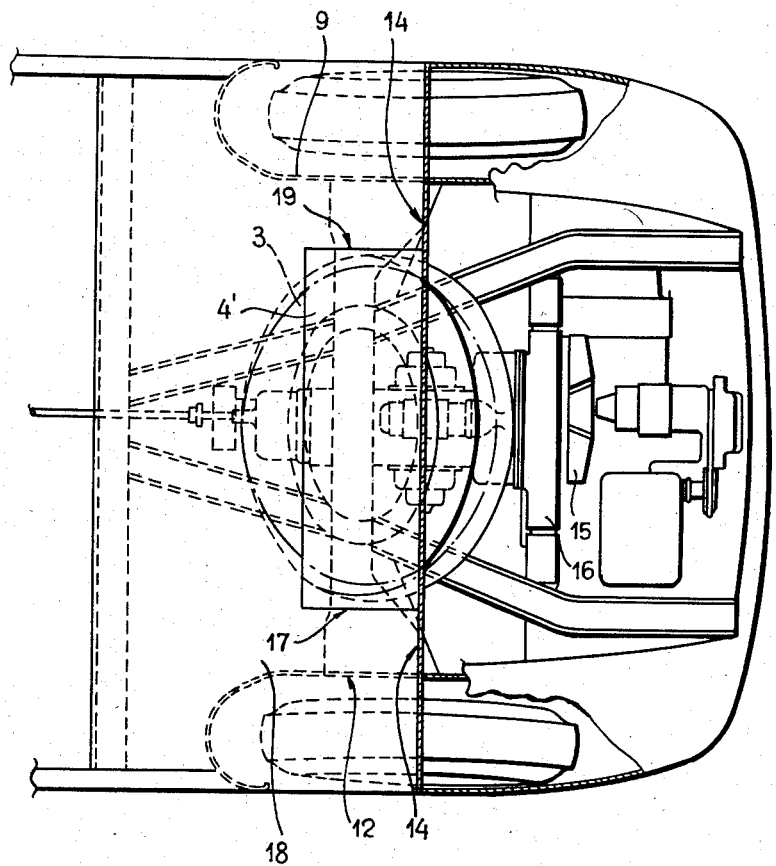

Even with a central location of the spare wheel, useful additional space can be obtained on both sides of the spare wheel by adopting the solution shown in Figures 4, 5 and 6. The forward wall of the compartment is indicated by 4′ and extends in this case between vertical walls 17 and 19 parallel with the longitudinal axis of the car, arranged on either side of the spare wheel and substantially triangular in form. The wall 4′ does not reach in this case to the lower limit of the spare wheel, but is limited to a horizontal plane 18 extending substantially through the wheel axis. The said horizontal plane is confined forwardly by the back-rest of the rear seats and backwardly by a vertical divided plane 14 arranged normally to the longitudinal car axis. Two additional compartments result thereby on either side of the spare wheel and can be utilised for the baggage. The horizontal plane serves to limit the depth of the lateral baggage compartments which, in the absence of said surface, would be excessively deep relatively to the top opening for insertion of the baggage.

In the constructions shown in Figures 1 and 2 it has been assumed that the spare wheel 3 is removed from its housing by lifting the engine hood 6. In the modification shown in Figures 4, 5 and 6 the engine hood 6′ is pivoted at 6a to the stationary part of the car body, another lid 13 being provided for removal of the spare wheel 3, the said lid 13 being pivoted at 13a to the car body and indicated by a dash-and-dot line at 13′ in its open position.

In the various embodiments of the invention (Figs. 1 and 4) in the lid 6a or hood 6, there is provided a plurality of formed openings or formed louvres E which provide an air ingress by which the air is directed toward the rearwardly inclined wall 4 or 4′ and between the assembled spare wheel 3 and said wall, so that the air flows around the spare wheel as is shown by the arrows, and then through the radiator 16 confronting the wall and out formed openings or louvres U.

A wall portion or partition AU, in cooperation with the radiator 16, subdivides the engine compartment into a rear compartment in which the engine is located, and a compartment C in which the spare wheel is located.

It will be understood that by positioning the louvres or openings E well above the wheel as shown, particularly clean air is provided for cooling the engine since the possibility of road dust entering the air intake openings is greatly reduced. Moreover, the position of the openings insures airflow over and around the spare wheel so that the tire thereon is constantly cooled and in this manner the tire is not attacked by the engine heat.

Thus the engine compartment is used for mounting the tire or spare wheel and greater space may be provided behind the rear seats in the passenger compartment so that a luggage compartment can be provided between the rear-seat and the rearwardly inclined wall 4 or 4′.

By use of the arrangement according to the invention a small rear-engined vehicle is provided with a large storage area, since it has a forward trunk or storage compartment (not shown) free of the spare tire; and the aforementioned luggage compartment is immediately accessible from the interior of the vehicle, where baggage may be carried so that it is readily available if desired, without the necessity of leaving the vehicle to open the trunk or forward stowage compartment.

It will be understood that the present invention may also be applied to air-cooled engines (not shown), in which case the partition AU is mounted on the engine in known manner, to cooperate with the engine in directing the air flow over the cooling ribs of the engine.

While preferred embodiments of the invention have been illustrated and described, it will be understood that the invention is in no way limited to these embodiments, and that many changes may be made within the spirit and scope of the invention, as defined by the following claims.

What I claim is:

1. In a motor vehicle having a passenger compartment and an engine compartment in the rear end thereof and a rearwardly inclined wall forward of the engine compartment to separate it from the passenger compartment, means for supporting an assembled spare wheel in an inclined position substantially parallel to the rearwardly inclined wall and spaced therefrom and spaced from the lateral walls of the compartment, at least one lid over the compartment operable to opened and closed positions and having formed openings disposed above the tire to provide air ingress into the compartment in a direction toward said wall and between the assembled wheel and the wall, means defining formed openings at the rear of the compartment to provide an air egress from the compartment, an engine in said compartment having a radiator mounted in the flow path of the air and between the wheel and the air egress.

2. In a motor vehicle having a passenger compartment and an engine compartment in the rear end thereof and a rearwardly inclined wall forward of the engine compartment to separate it from the passenger compartment, means for supporting an assembled spare wheel in an inclined position substantially parallel to the rearwardly inclined wall and spaced therefrom and spaced from the lateral walls of the compartment, at least one lid over the compartment operable to opened and closed positions and having formed openings disposed above the tire to provide air ingress into the compartment in a direction toward said wall and between the assembled wheel and the wall, means defining formed openings at the rear of the compartment to provide an air egress from the compartment, an engine in said compartment having a radiator mounted confronting the forward wall and the flow path of the air and between the wheel and the air egress, and wall means cooperating with the radiator to subdivide the engine compartment into a spare wheel compartment and a main engine compartment.

3. In a motor vehicle having a passenger compartment and an engine compartment in the rear end thereof and a rearwardly inclined wall forward of the engine compartment to separate it from the passenger compartment, means for supporting an assembled spare wheel in an inclined position substantially parallel to the rearwardly inclined wall, and spaced therefrom at least one lid over the compartment operable to opened and closed positions and having formed openings disposed above the tire to provide air ingress into the compartment in a direction toward said wall and between the assembled wheel and the forward wall, means defining formed openings at the rear of the compartment to provide an egress from the compartment, an engine in said compartment having a radiator mounted in the flow path of the air and between the wheel and the air egress, the spare wheel being disposed laterally with respect to the longitudinal plane of the vehicle, and cooperating upright portions defining a baggage space disposed laterally and radially of the spare wheel and which is in communication with the passenger compartment.

4. In a motor vehicle having a passenger compartment and an engine compartment in the rear end thereof and a rearwardly inclined wall forward of the engine compartment to separate it from the passenger compartment, means for supporting an assembled spare wheel in an inclined position substantially parallel to the rearwardly inclined wall and spaced therefrom, at least one cover over the compartment operable to opened and closed positions and having formed openings disposed above the tire to provide air ingress into the compartment in a direction toward said wall between the assembled wheel and the wall, means defining formed openings at the rear of the compartment to provide an air egress from the compartment, an engine in said compartment having a radiator mounted in the flow path of the air between the wheel and air egress, the spare wheel being disposed symmetrically with respect to the longitudinal plane of the vehicle, and cooperating upright portions laterally confining the space in which the wheel is mounted and defining two baggage spaces oppositely disposed laterally and radially of the wheel and in communication with the passenger compartment.

References Cited in the file of this patent

UNITED STATES PATENTS

| | | |
|---|---|---|
| 2,000,360 | Stout | May 7, 1935 |
| 2,038,581 | Lent | Apr. 28, 1936 |
| 2,647,012 | Walker | July 28, 1953 |
| 2,756,834 | Dauben | July 31, 1956 |

FOREIGN PATENTS

| | | |
|---|---|---|
| 872,978 | France | Mar. 2, 1942 |
| 874,335 | France | Apr. 27, 1942 |
| 369,753 | Italy | Mar. 29, 1939 |
| 459,586 | Italy | Sept. 18, 1950 |